(12) United States Patent
Barberan Latorre

(10) Patent No.: US 12,143,553 B2
(45) Date of Patent: Nov. 12, 2024

(54) METHOD AND MACHINE FOR DIGITAL PRINTING WITH NEUTRAL COLOURS

(71) Applicant: Jesus Francisco Barberan Latorre, Castelldefels (ES)

(72) Inventor: Jesus Francisco Barberan Latorre, Castelldefels (ES)

( * ) Notice: Subject to any disclaimer, the term of this patent is extended or adjusted under 35 U.S.C. 154(b) by 149 days.

(21) Appl. No.: 17/614,250

(22) PCT Filed: Jun. 2, 2020

(86) PCT No.: PCT/ES2020/070363
§ 371 (c)(1),
(2) Date: Nov. 24, 2021

(87) PCT Pub. No.: WO2020/245481
PCT Pub. Date: Dec. 10, 2020

(65) Prior Publication Data
US 2022/0224803 A1     Jul. 14, 2022

(30) Foreign Application Priority Data

Jun. 7, 2019   (ES) .................................. 201930518
Jul. 16, 2019  (ES) .................................. 193826039

(51) Int. Cl.
*H04N 1/62*     (2006.01)
*B41M 5/00*     (2006.01)
(Continued)

(52) U.S. Cl.
CPC ...... *H04N 1/40012* (2013.01); *B41M 5/0023* (2013.01); *B41M 7/0081* (2013.01)

(58) Field of Classification Search
CPC .... H04N 1/6027; H04N 1/6038; H04N 1/034; B41M 5/0023; B41M 5/0047;
(Continued)

(56) References Cited

U.S. PATENT DOCUMENTS

2003/0056687 A1   3/2003 Sano
2003/0226473 A1   12/2003 Ishimoto
(Continued)

FOREIGN PATENT DOCUMENTS

JP   2004099657 A   4/2004
JP   2016017103 A   2/2016

OTHER PUBLICATIONS

International Search Report for Corresponding International Application No. PCT/ES2020/070363 dated Sep. 14, 2020 and English translation; 6 pages.

*Primary Examiner* — Jamares Q Washington
(74) *Attorney, Agent, or Firm* — LUCAS & MERCANTI, LLP

(57) ABSTRACT

A method and machine for digital printing with neutral colors, wherein the method uses a digital printing machine which has a print head which in turn has an ejector; providing a substrate for receiving digital printing; providing a printing product which has at least one light black (LK) printing ink having a concentration of black pigment that is lower than that of a black (K) ink; arranging the ejector with the printing product such that it is arranged for ejecting the printing product on the substrate; and performing digital printing on the substrate by means of ejecting the printing product according to a predefined design having at least one neutral color.

8 Claims, 3 Drawing Sheets

(51) Int. Cl.
*B41M 7/00* (2006.01)
*H04N 1/40* (2006.01)

(58) Field of Classification Search
CPC .. B41M 5/0064; B41M 5/0058; B41M 5/007; B41M 5/0076; B41M 1/14
USPC .......................... 358/518, 3.1, 502; 382/162
See application file for complete search history.

(56) References Cited

U.S. PATENT DOCUMENTS

| | | |
|---|---|---|
| 2004/0035320 A1 | 2/2004 | Sano et al. |
| 2005/0140997 A1* | 6/2005 | Shirasawa ................ H04N 1/54 358/1.9 |
| 2005/0288386 A1 | 12/2005 | Ishikawa |
| 2008/0216684 A1 | 9/2008 | Horai et al. |
| 2009/0179933 A1* | 7/2009 | Otsuki ................ B41J 2/04586 347/14 |
| 2011/0083581 A1* | 4/2011 | Kataoka ................ C09D 11/40 106/31.6 |
| 2014/0221536 A1* | 8/2014 | Yatake ................ C09D 11/324 524/88 |
| 2015/0035905 A1* | 2/2015 | De Meutter ......... B41M 7/0081 347/102 |
| 2020/0070544 A1* | 3/2020 | Ohnishi ................ B41J 2/2103 |

* cited by examiner

METHOD AND MACHINE FOR DIGITAL PRINTING WITH NEUTRAL COLOURS

CROSS REFERENCE TO RELATED APPLICATION

This Application is a 371 of PCT/ES2020/070363, filed on Jun. 2, 2020, which claimed priority of Spanish Application No. 201930518, filed Jun. 7, 2019 and European Application No. 19382603.9, filed Jul. 16, 2019, which are incorporated herein by reference.

FIELD OF THE ART

The present invention relates to the industry dedicated to digital printing technology for printing on substrates.

STATE OF THE ART

Use of digital printing technology for printing on substrates is known today. Printing on substrates requires on a considerable number of occasions printing designs with a variety of colors by means of printing inks. According to this, limited colors, mainly such as cyan (C), magenta (M), and yellow (Y), are conventionally used to obtain the variety of required colors.

For the purpose of prolonging the use of printing inks of each of the mentioned colors in prints without having to reload or the like, a solution for printing performed by means of digital printing machines or printers, for example industrial InkJet "single pass" machines, is to use black (K) printing ink given that the color black (K) corresponds with a result of adding together, in a similar proportion, cyan (C), magenta (M), and yellow (Y).

Therefore the conventional use of black (K) printing ink for printing with neutral colors leads to considerable savings in the consumption of cyan (C), magenta (M), and yellow (Y) printing inks.

However, today with industrial InkJet "single pass" digital printers it is difficult or even impossible to print neutral colors with a good quality without observing printing defects such as, for example, banding (also called color banding) and color inconsistency in the form of shadows derived from non-neutral colors.

The colors can be defined according to a spatial Cartesian coordinate system defined by three vector axes (A, B, L), two of which correspond with two chromatic components (A, B) which define tonality and saturation, and the other corresponds with a luminosity component (L) which defines lightness or luminosity.

The luminosity component (L) can be quantified according to a value between 0, which corresponds with pure black, and 100, which corresponds with pure white. With regard to the chromatic components (A, B), one of such components (A) represents the green-red component, with green being for negative values and red for positive values, while the other one of said chromatic components (B) represents the blue-yellow component, with blue being for negative values and yellow for positive values. The value of each of the chromatic components can be quantified between positive 100 (+100) and negative 100 (−100) such that the quantification is transformed into percentage amounts.

Neutral colors, also commonly referred to as achromatic colors, can thereby be identified as the colors having a value of the two chromatic components (A, B) equal to zero or close to zero. Values which, on a scale defined from −100 to +100, are other than zero and are between positive 25 (+25) and negative 25 (−25), both values included, are to be understood as values close to zero.

Likewise, neutral colors can be classified as absolute when the value of the two chromatic components (A, B) is equal to zero and as close to absolute when the value of the two chromatic components (A, B) is close to zero or when one of the two is zero and the other is close to zero.

According to this, the absolute neutral colors are white or pure white, black or pure black, and the entire grayscale between white and black. In close to absolute neutral colors, in turn, the luminosity component (L) clearly predominates over the chromatic components (A, B) with the value of said chromatic components (A, B) being other than zero and between −25 and +25, both included, such that they have a grayish tonality.

Usually all the primary colors CMYK (cyan, magenta, yellow, and black) are involved when printing with neutral colors. As a consequence, any misalignment of any print head is clearly or readily reflected in the print, causing a visible defect in the form of a change in tonality.

According to this, image processing is known to be performed on designs to be printed such that there are obtained color profiles according to which the amounts to be used of each of the colors required in each of the designs are determined.

In the creation of the color profile using the CMYK composition, CMY is used for generating neutral colors. The misalignments the print heads may present can result in generating a rather imprecise color measurement. This results in an inaccuracy when printing with neutral colors or colors that are close to neutral tonalities.

To enable printing designs of this type with just four-color (CMYK) printing, image processing must be adjusted so that more black (K) printing ink is used at the expense of cyan (C), magenta (M), and yellow (Y) printing inks. Use of these three inks is thereby reduced when printing with neutral colors.

There is obviously a negative aspect to all of this, which is that in lighter neutral tonalities, i.e., the closer the value of the luminosity component is to the 100 of pure white, black printing dots can be readily seen and a lack of quality is perceived. These dots, or "pixelation," of black (K) printing ink are due to the fact that the mentioned neutral colors with lighter tonalities, when printed, have a lower percentage of black (K), which results directly in a lack of quality in prints made according to neutral colors.

In view of the described drawbacks or limitations of the solutions existing today, a solution which allows printing with neutral colors is necessary, improving the printing quality while at the same time maintaining savings in the use of cyan (C), magenta (M), and yellow (Y) printing inks when printing with same.

OBJECT OF THE INVENTION

For the purpose of meeting this objective and solving the technical problems discussed up until now, in addition to providing additional advantages which can be derived below, the present invention provides a method for digital printing with neutral colors, which comprises using preferably a single pass type digital printing machine which comprises a print head; providing a substrate for receiving digital printing; providing a printing product, preferably curable by ultraviolet radiation, which comprises at least one light black printing ink having a concentration of black pigment that is lower than that of a black ink; arranging the print head with the printing product such that it is arranged for ejecting the printing product on the substrate; and performing digital printing on the substrate by means of ejecting the printing product according to a design comprising at least one neutral color.

Preferably, the concentration of the black pigment of the at least one light black printing ink is between 10% and 40% that of the black printing ink.

The substrate preferably has a discontinuous or continuous format and comprises a material that can be selected from wood, HPL, plastic, metal, composite, paper, and cardboard.

Performing digital printing comprises ejecting the at least one light black printing ink in lieu of at least one printing ink of a color that can be selected from cyan, magenta, yellow, and black.

The printing product additionally comprises at least another printing ink that can be selected from a cyan printing ink, a magenta printing ink, a yellow printing ink, black printing ink, and any one combination of two or more of the aforementioned.

Preferably, there are at least two light black printing inks comprised in the printing product, with the concentration of the black pigment being different from one another.

The present invention provides the digital printing machine for digital printing with neutral colors, which comprises the printing product comprising the at least one light black printing ink having a concentration of black pigment that is lower than that of a black ink, and a control unit configured such that the digital printing machine is arranged for performing digital printing on a substrate by means of ejecting the printing product according to a design comprising at least one neutral color.

The control unit is configured such that the digital printing machine is arranged for ejecting the at least one light black printing ink instead of ejecting the cyan printing ink, the magenta printing ink, the yellow printing ink, and/or the black printing ink for performing digital printing.

Preferably, the printing product additionally comprises at least another printing ink that can be selected from cyan printing ink, magenta printing ink, yellow printing ink, black printing ink, and any one combination of two or more of the aforementioned.

DETAILED DESCRIPTION OF THE INVENTION

The present invention relates to a method for digital printing with neutral colors by means of using a digital printing machine or printer, to improve the quality of digital printing comprising at least one of the neutral colors, both absolute and close to absolute neutral colors, or neutral colors with a grayish tonality. Furthermore, the present invention relates to the digital printing machine (InkJet) used in carrying out said method.

The colors can be defined according to a spatial Cartesian coordinate system defined by three vector axes (A, B, L), two of which correspond with two chromatic components (A, B) which define tonality and saturation, and the other corresponds with a luminosity component (L) which defines lightness or luminosity.

Figure 1:
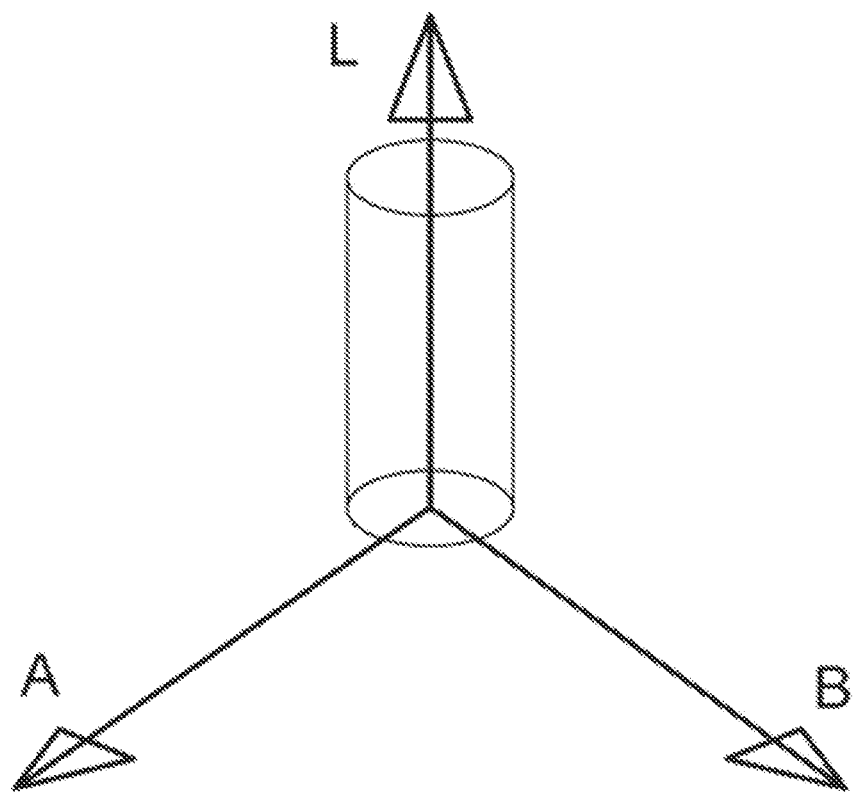
FIG. 1 graphically shows a luminosity component and two chromatic components according to three vector axes and according to which the colors can be defined.

Neutral or achromatic colors in the present description are identified as colors having a value of the two chromatic components equal to zero or close to zero. See FIG. 1.

Values which, on a scale defined from negative 100 (−100) to positive 100 (+100), are other than zero and are between positive 25 (+25) and negative 25 (−25), both values included, are to be understood as values close to zero.

According to this, neutral colors are classified as absolute when the value of the two chromatic components is equal to zero and as close to absolute when the value of the two chromatic components is close to zero or when one of the two chromatic components is zero and the other is close to zero.

The digital printing is preferably performed on substrates by means of the digital printing machine, which is a single pass type machine. Likewise, the machine comprises a print head, and preferably several of said heads. Each of the print heads comprised in the machine comprises at least one ejector, and preferably a plurality of ejectors.

The substrates to be printed on or treated have a discontinuous or continuous format, i.e., they are elements that can be fed to the machine either individually and independently or else continuously such that they are, for example, extended or unwound from a wound or folded arrangement.

Likewise, the substrates can be made of various materials, comprising a material preferably selected from wood, according to for example medium-density fiberboards or "MDF," high-density fiberboards or "HDF," and particle board; HPL; plastic; composite; metal, such as, for example, aluminum, steel and copper; and cellulose derivatives such as, for example, paper and cardboard.

The digital printing machine comprises a printing product. This printing product is arranged stored or housed in the corresponding digital print heads such that it is arranged for being ejected onto the substrates through the ejectors.

This printing product comprises at least one printing ink. Preferably, there are two printing inks comprised in the printing product, more preferably three, even more preferably four, and still more preferably at least five or at least six, the printing inks corresponding with a different color or one and the same color with a color tonality that is different from one another.

The printing inks comprise monomers, photoinitiators, and a certain concentration of a pigment. The pigment is selected depending on the color of the printing ink. When the printing ink is black (K), with regard to a composition thereof, the pigment is based on carbon particles.

The black (K) printing ink refers to common or standard black printing ink. This standard black (K) corresponds with what is commonly found in digital printing machines either alone or along with colors such as cyan (C), magenta (M), and yellow (Y), evidently in the form of the corresponding printing inks.

When defining the printing inks it is common to use a physical magnitude call optical density, which measures the absorption of an optical element per unit of distance, for a given wavelength. By way of example, the optical density of the mentioned black (K) printing ink is between 1.6 and 2.2, with the optical density being measured using an ilpro2 spectrophotometer in mode M0 and 2° (angle of observation) 10 minutes after printing.

For the purpose of performing printing according to the mentioned neutral colors, the digital printing machine comprises at least one of the printing inks according to a color that can be referred to as light black (LK), according to the fact that its concentration of black pigment or carbon particles is lower than that of black (K) printing ink. The color tonality of said at least one light black (LK) printing ink, although black, is thereby different from that of black (K) printing ink.

The concentration of black pigment of light black (LK) printing inks is between 10% and 40% compared to the concentration of black pigment of black (K) printing ink.

According to this, the optical density of the at least one light black (LK) printing ink is also lower than the optical density corresponding to black (K) printing ink. By way of comparison, when the concentration of black pigment of the at least one light black (LK) printing ink is 20% that of black (K) printing ink, the optical density of the at least one light black (LK) printing ink is 40% that of said black (K) printing ink.

According to this, there are optionally two or more light black (LK) printing inks comprised in the digital printing machine, with the concentration of black pigment or carbon particles thereof being different from one another.

The digital printing machine additionally comprises a control unit configured such that said machine ejects one or more of the mentioned light black (LK) printing inks through the corresponding ejectors, printing the corresponding neutral color instead of ejecting the cyan (C), magenta (M), yellow (Y), and/or black (K) printing ink.

As described, the present method comprises ejecting at least one of the light black (LK) printing inks, printing the corresponding neutral color in lieu of cyan (C), magenta (M), yellow (Y), and/or black (K) printing ink.

The ejection of one or more of the light black (LK) printing inks, performing digital printing, is carried out for obtaining on the corresponding substrate a design comprising at least one of the neutral colors.

According to the design, the method comprises performing image processing such that a there is obtained color profile according to which the amounts to be used of each of the colors cyan (C), magenta (M), yellow (Y), and black (K) are determined. Said design is thereby preferably predefined.

The use, utilization, or ejection of the at least one light black (LK) printing ink in lieu of black (K) printing ink, according to the amount of black (K) determined, provides printing with neutral colors in a more reliable and stable manner.

This is due to the fact that the use of at least one of the light black (LK) printing inks enables using more droplets, i.e., a larger amount of ejection points of said ink (LK), for obtaining the print with a certain black tonality or according to the amount of black (K) determined, which significantly reduces or even eliminates "pixelation" or dots of the printing inks of the other colors (C, M, Y, K) that can be used in obtaining or printing with neutral colors on substrates.

The use of the at least one light black (LK) printing ink in lieu of cyan (C), magenta (M), and yellow (Y) printing inks eliminates problems of tonality drifts or color inconsistency in the printing thereof in the form of shadows.

Furthermore, the use of light black (LK) printing inks instead of cyan (C), magenta (M), and yellow (Y) printing inks results in savings in said printing inks. These savings are substantial and can even reach 20% depending on the tonality of the corresponding neutral color and the image processing of the corresponding design by using only light black (LK) printing inks to obtain both absolute neutral colors and close to absolute neutral colors.

Likewise, the use of light black (LK) printing inks instead of cyan (C), magenta (M), and yellow (Y) printing inks reduces a psychophysical phenomenon generally defined as the situation in which two samples of a color coincide under certain conditions but differ, however, under other different certain conditions, commonly referred to as "metamerism".

The latter is due to the fact that black (K) is the color that absorbs the most and therefore reflects the least light, such that the use of light black (LK) printing inks instead of cyan (C), magenta (M), and yellow (Y) printing inks enables performing the corresponding printing with the perception of neutral colors being more stable, i.e., less sensitive to changes depending on the type and angle of incidence of the light to which it is exposed.

The digital printing machine preferably comprises, in addition to one or more of the light black (LK) printing inks, the cyan (C) printing ink, magenta (M) printing ink, yellow (Y) printing ink, black (K) printing ink, or any one combination of two or more of the aforementioned.

According to a preferred embodiment, the digital printing machine is arranged for performing digital printing according to a complete range of the colors. The digital printing machine thereby comprises cyan (C) printing ink, magenta (M) printing ink, yellow (Y) printing ink, and light black (LK) printing ink, optionally in addition to black (K) printing ink as well.

The control unit is thus configured such that the digital printing machine ejects one or more of the mentioned light black (LK) printing inks through the corresponding ejectors, performing printing with the required neutral colors, instead of ejecting cyan (C), magenta (M), yellow (Y), and/or black (K) printing ink, though the digital printing machine still comprises cyan (C), magenta (M), yellow (Y), and black (K) printing inks.

The present method is carried out with said digital printing machine. The method thereby comprises ejecting at least one of the light black (LK) printing inks, performing printing with one or more of the neutral colors in lieu of cyan (C), magenta (M), and yellow (Y) printing inks, optionally also in lieu of black (K) printing ink as well.

Likewise, the method comprises ejecting at least one of the light black (LK) printing inks, performing printing with one or more of the neutral colors in lieu of cyan (C), magenta (M), yellow (Y), and black (K) printing inks, even when the digital printing machine is arranged for ejecting cyan (C), magenta (M), and yellow (Y) printing inks, optionally in addition to black (K).

Misalignments of the print heads, and more specifically of the ejectors thereof, are particularly noticeable when printing with absolute neutral colors, although they are also noticeable when printing with close to absolute neutral colors. Said misalignments result in printing defects in terms of obtaining the desired predetermined tonalities. Some of said defects are, for example, banding or color banding, tonality drifts, and "pixelation".

According to this fact, by using less cyan (C), magenta (M), and yellow (Y) printing inks, the mentioned defects in obtaining the desired predetermined tonalities are reduced or eliminated.

Additionally, by using or utilizing carbon particles according to light black (LK) printing ink, metamerism is also reduced or even eliminated. Likewise, the use of the corresponding light black (LK) printing inks instead of cyan (C), magenta (M), yellow (Y), and black (K) printing inks reduces or even eliminates expansion defects of the printing ink droplets which are reflected in the form of a change in tonality with respect to the desired predetermined tonality.

For the purpose of further explaining the invention, two examples are described below. According to these examples, the method for digital printing uses or utilizes at least one of the light black (LK) printing inks to increase or improve, in relation to print quality, the digital printing performed on the substrates with the InkJet single pass digital printing machine, said printing comprising one or more of the neutral colors.

An area on the corresponding substrate to be printed with the corresponding design comprising several of the neutral colors is considered in the examples.

Figure 2:
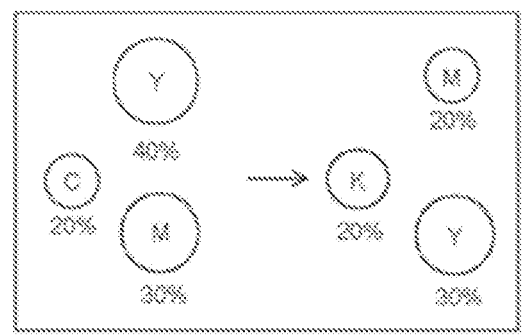
FIG. 2 shows a schematic view of an example according to a method for digital printing.

According to the example depicted by means of FIG. 2, the design is made up of 20% cyan (C), 30% magenta (M), and 40% yellow (Y). This same design is processed by means of the control unit comprised in the digital printing machine such that is it is calculated that the design can be obtained according to about 20% black (K), 20% magenta (M), and 30% yellow (Y).

Figure 3:
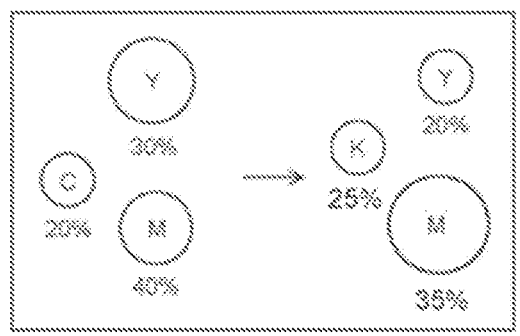
FIG. 3 shows a schematic view of another example according to the method for digital printing.
Figure 4:
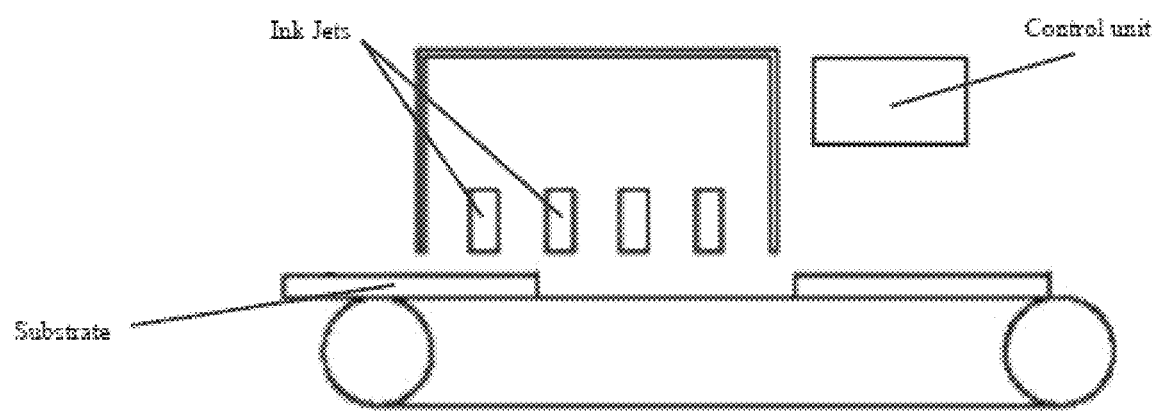

According to the example depicted by means of FIG. 3, the design is made up of 20% cyan (C), 40% magenta (M), and 30% yellow (Y). This same design is processed by means of the control unit comprised in the digital printing machine such that it is calculated that the design can be obtained according to about 25% black (K), 35% magenta (M), and 20% yellow (Y).

In the corresponding area, this translates into specific pixels to be ejected with the black (K), magenta (M), and yellow (Y) printing inks, with these ejections being distributed according to a determination performed according to the corresponding image processing performed through the control unit.

The method thus goes from making or printing the design according to cyan (C), magenta (M), and yellow (Y), to making the same design according to magenta (M), yellow (Y), and black (K). Consumption of cyan (C) printing ink, magenta (M) printing ink, and yellow (Y) printing ink is thereby primarily reduced.

In the present method, in addition or as an alternative to the mentioned determination that is performed, another determination is performed. In the area, this translates into specific pixels ejected with light black (LK), magenta (M), and yellow (Y) printing inks, with these ejections being distributed according to this other determination performed by means of software according to the corresponding image processing of the designs performed through the control unit.

This other determination is thereby performed such that in said area, the corresponding percentage of black (K) is to be provided by means of light black (LK) printing ink, the corresponding percentage of magenta (M) by means of magenta (M) printing ink, and the corresponding percentage of yellow (Y) by means of yellow (Y) printing ink.

According to this, said other determination entails determining a set of pixels to be ejected with the light black (LK) printing ink, with this set of pixels being larger in number or amount than those that may be determined to be ejected with black (K) printing ink in order to provide the same amount of black.

The other determination is therefore performed such that instead of using black (K) printing ink, light black (LK) printing ink is used or utilized for a given amount of black.

The present method thus solves or at least decreases the defects characteristic of misalignments and/or the expansion of droplets of the printing inks to be generated during composition or obtaining even one or more of the neutral colors by means of cyan (C), magenta (M), and yellow (Y) printing inks.

Another defect that may occur in digital printing with neutral colors is directly related to the print heads and refers to a volume per droplet of printing inks. In the event of a misalignment in the volume of one or more of the ejected droplets of the printing ink of the corresponding color, the defect is directly and clearly noticeable. The present method reduces or even eliminates said defect by utilizing light black (LK) printing ink because by reducing the use of cyan (C), magenta (M), and yellow (Y) printing inks, the defects inherent to their use such as the mentioned misalignment in the volume of the droplets are also reduced.

Thus the present method provides the advantage that in order to achieve a specific percentage of black (K), there has to be a larger amount of pixels to be ejected because this light black (LK) has, percentage-wise, an optical density value that is lower than that of black (K). The obtained printing of the predefined design on the substrate is thereby less "pixelated," i.e., more homogenous.

According to that which has been described, the use of light black (LK) printing ink at least reduces the "pixelation" to be generated when using black (K) printing ink, such that homogeneity in the digital prints is increased. It also at least reduces the defects of misalignment and expansion of the droplets to be generated when using cyan (C), magenta (M), yellow (Y), and black (K) printing inks, in addition to at least reducing metamerism given that according to the carbon particles, black is the color that reflects the least light.

The present invention is particularly relevant when the printing inks are curable by ultraviolet radiation. Printing inks curable by ultraviolet radiation have a smaller, even nil, capacity of mixing with one another and a different capacity for expansion compared to a printing inks exposed to another type of curing, such that they are more defined, which entails a higher tendency to generate the defects described above compared to the case of printing inks curable by other different means, defects which are rectified by means of the present invention.

The present method thereby comprises performing printing for obtaining the corresponding design on the substrate, said design comprising at least one of the neutral colors, with light black (LK) printing inks used being those curable by ultraviolet radiation.

Likewise, in the event of having at least of one of the cyan (C), magenta (M), yellow (Y), or black (K) printing inks arranged for being ejected for obtaining the at least one of the neutral colors, this or these printing inks are preferably curable by ultraviolet radiation like light black (LK) printing ink or inks. According to this, the digital printing machine comprises the corresponding printing inks, with said printing inks being curable by ultraviolet radiation.

The invention claimed is:

1. A method for digital printing neutral colors in an image, which comprises:
   using a single pass type digital printing machine comprising a print head;
   providing a substrate for receiving digital printing;
   providing a printing ink set comprising a cyan (C) printing ink, a magenta (M) printing ink, a yellow (Y) printing ink and a black (K) printing ink, and at least one light black (LR) printing ink having a first concentration of black pigment that is lower than a second concentration of the black (K) printing ink;
   arranging the print head with the printing ink set such that the print head is adapted to eject the printing inks on the substrate;
   adjusting a first printing design that includes a first amount of cyan (C) printing ink, a second amount of magenta (M) printing ink, and a third amount of yellow (Y) ink by substituting a fourth amount of black (K)

printing ink for a selected one of the printing inks of the first design, thereby generating an adjusted printing design that includes the fourth amount of black (K) printing ink and corresponding amounts of two non-selected printing inks of the first printing design;

determining a first number of pixels of black (K) printing ink to be ejected in the adjusted printing design;

determining a second number of pixels of light black (LK) printing ink to be ejected based on the first number of pixels, wherein the second number of pixels is greater than the first number of pixels;

performing a digital printing in the image, on the substrate, based on the adjusted printing design and the second number of pixels, by means of ejecting the corresponding amounts of the two non-selected printing inks and the second number of pixels of light black (LK) printing ink, in areas of the substrate where visible defects due to print head misalignments would be noticed in the form of a change in tonality when the digital printing were to be performed ejecting only the cyan (c), magenta (M) or yellow (Y) printing inks.

2. The method according to claim 1, wherein the first concentration of black pigment of the at least one light black (LK) printing ink is between 10% and 40% of the second concentration of the black (K) printing ink.

3. The method according to claim 1, wherein the substrate has a discontinuous or continuous format and comprises a material that can be selected from the group consisting of wood, HPL, plastic, metal, composite, paper, and cardboard.

4. The method according to claim 1, wherein the printing ink set additionally comprises at least another printing ink that can be selected from a cyan (C) printing ink, a magenta (M) printing ink, a yellow (Y) printing ink, a black (K) printing ink, and any one combination of two or more of the aforementioned.

5. The method according to claim 1, wherein the printing ink set comprises at least two light black (LK) printing inks, with different concentrations of black pigment.

6. A single pass machine for digital printing neutral colors in an image, comprising:
a printing ink set comprising a cyan (C) printing ink, a magenta (M) printing ink, a yellow (Y) printing ink and a black (K) printing ink, and at least one light black (LK) printing ink having a concentration of black pigment that is lower than that of the black (K) ink,
a control unit configured such that the single pass machine is adapted to perform digital printing on a substrate by ejecting the printing inks according to a neutral color image, such that the single pass machine is arranged for ejecting the at least one light black (LK) printing ink instead of the cyan (C) printing ink, the magenta (M) printing ink and/or the yellow (Y) printing ink for performing digital printing;

wherein the single pass machine is adapted to:
adjust a first printing design that includes a first amount of cyan (C) printing ink, a second amount of magenta (M) printing ink, and a third amount of yellow (Y) ink by substituting a fourth amount of black (K) printing ink for a selected one of the printing inks of the first design, thereby generating an adjusted printing design that includes the fourth amount of black (K) printing ink and corresponding amounts of two non-selected printing inks of the first printing design;

determine a first number of pixels of black (K) printing ink to be ejected in the adjusted printing design;

determine a second number of pixels of light black (LK) printing ink to be ejected based on the first number of pixels, wherein the second number of pixels is greater than the first number of pixels;

perform a digital printing in the neutral color image, on the substrate, based on the adjusted printing design and the second number of pixels, by ejecting the corresponding amounts of the two non-selected printing inks and the second number of pixels of light black (LK) printing ink, in areas of the substrate where visible defects due to print head misalignments would be noticed in the form of a change in tonality when the digital printing were to be performed ejecting only the cyan (c), magenta (M) or yellow (Y) printing inks.

7. The single pass machine according to claim 6, wherein the control unit is configured such that the single pass machine is adapted to eject the at least one light black (LK) printing ink instead of a cyan (C) printing ink, a magenta (M) printing ink, a yellow (Y) printing ink, and/or a black (K) printing ink for performing digital printing.

8. The single pass machine according to claim 7, wherein the printing ink set additionally comprises at least a second printing ink selected from cyan (C) printing ink, magenta (M) printing ink, yellow (Y) printing ink, black (K) printing ink, and any combination of two or more of the aforementioned.

* * * * *